United States Patent
DiSpazio

(10) Patent No.: US 9,174,810 B1
(45) Date of Patent: Nov. 3, 2015

(54) WASTE BAG USE METHODS AND APPARATUS

(71) Applicant: Bull Bag, LLC, Branford, CT (US)

(72) Inventor: Paul G. DiSpazio, Guilford, CT (US)

(73) Assignee: Bull Bag, LLC, Branford, CT (US)

( * ) Notice: Subject to any disclaimer, the term of this patent is extended or adjusted under 35 U.S.C. 154(b) by 0 days.

(21) Appl. No.: 14/151,338

(22) Filed: Jan. 9, 2014

Related U.S. Application Data

(60) Provisional application No. 61/750,747, filed on Jan. 9, 2013, provisional application No. 61/759,734, filed on Feb. 1, 2013.

(51) Int. Cl.
*B65D 33/14* (2006.01)
*B65G 65/23* (2006.01)
*B60P 1/54* (2006.01)

(52) U.S. Cl.
CPC .. *B65G 65/23* (2013.01); *B60P 1/54* (2013.01)

(58) Field of Classification Search
USPC ......... 294/68.3, 68.26, 68.1, 68.2, 74, 75, 76, 294/77; 383/16, 24, 67; 220/4.33; 206/527
See application file for complete search history.

(56) References Cited

U.S. PATENT DOCUMENTS

| | | | |
|---|---|---|---|
| 540,116 A * | 5/1895 | Smith | 294/68.26 |
| 1,568,488 A * | 1/1926 | Weeks | 294/68.26 |
| 2,421,701 A * | 6/1947 | Johnson | 294/68.26 |
| 3,314,710 A * | 4/1967 | Edeburn | 294/68.26 |
| 3,743,122 A * | 7/1973 | Fortriede | 383/67 |
| 3,893,595 A * | 7/1975 | Khanna et al. | 383/76 |
| 4,142,754 A * | 3/1979 | Colvin | 294/77 |
| 4,295,677 A * | 10/1981 | Petrin | 294/68.26 |
| 4,811,419 A * | 3/1989 | Derby | 383/67 |
| 5,108,196 A * | 4/1992 | Hughes | 383/17 |
| 5,607,237 A * | 3/1997 | LaFleur | 383/17 |
| 5,695,286 A * | 12/1997 | Williamson et al. | 383/24 |
| 6,276,829 B1* | 8/2001 | Popp | 383/24 |
| 6,739,753 B2* | 5/2004 | Richardson et al. | 383/16 |
| 7,427,160 B2* | 9/2008 | Richardson et al. | 383/16 |
| 7,500,786 B2* | 3/2009 | Richardson et al. | 383/16 |
| 2001/0000464 A1* | 4/2001 | Beale | 414/607 |
| 2004/0151404 A1* | 8/2004 | Richardson et al. | 383/16 |
| 2006/0110074 A1* | 5/2006 | Richardson et al. | 383/24 |
| 2010/0322538 A1* | 12/2010 | Powell et al. | 383/16 |

FOREIGN PATENT DOCUMENTS

WO 2007/108833 A2 9/2007

* cited by examiner

*Primary Examiner* — Paul T Chin
(74) *Attorney, Agent, or Firm* — Bachman & LaPointe, P.C.

(57) ABSTRACT

In a method for using a dumpster bag, the bag comprises: a flexible bag member including a bottom and a sidewall structure extending upward from the bottom to a rim; and a plurality of loops. The method comprises: engaging a hoist to a group of the loops; using the hoist to lift the bag containing contents; releasing the hoist from one or more of the loops; and using the hoist to again lift the bag to discharge the contents from the bag.

19 Claims, 8 Drawing Sheets

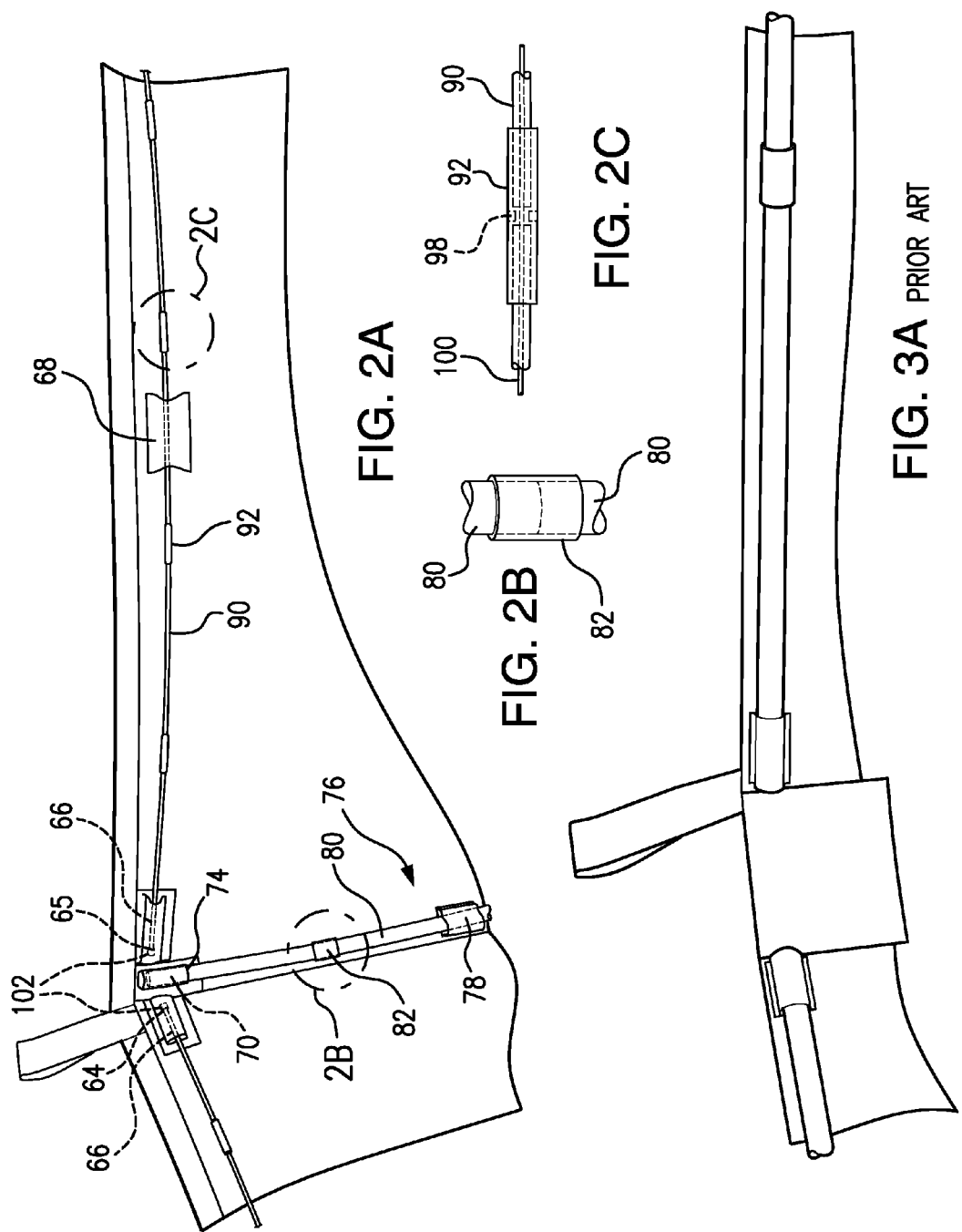

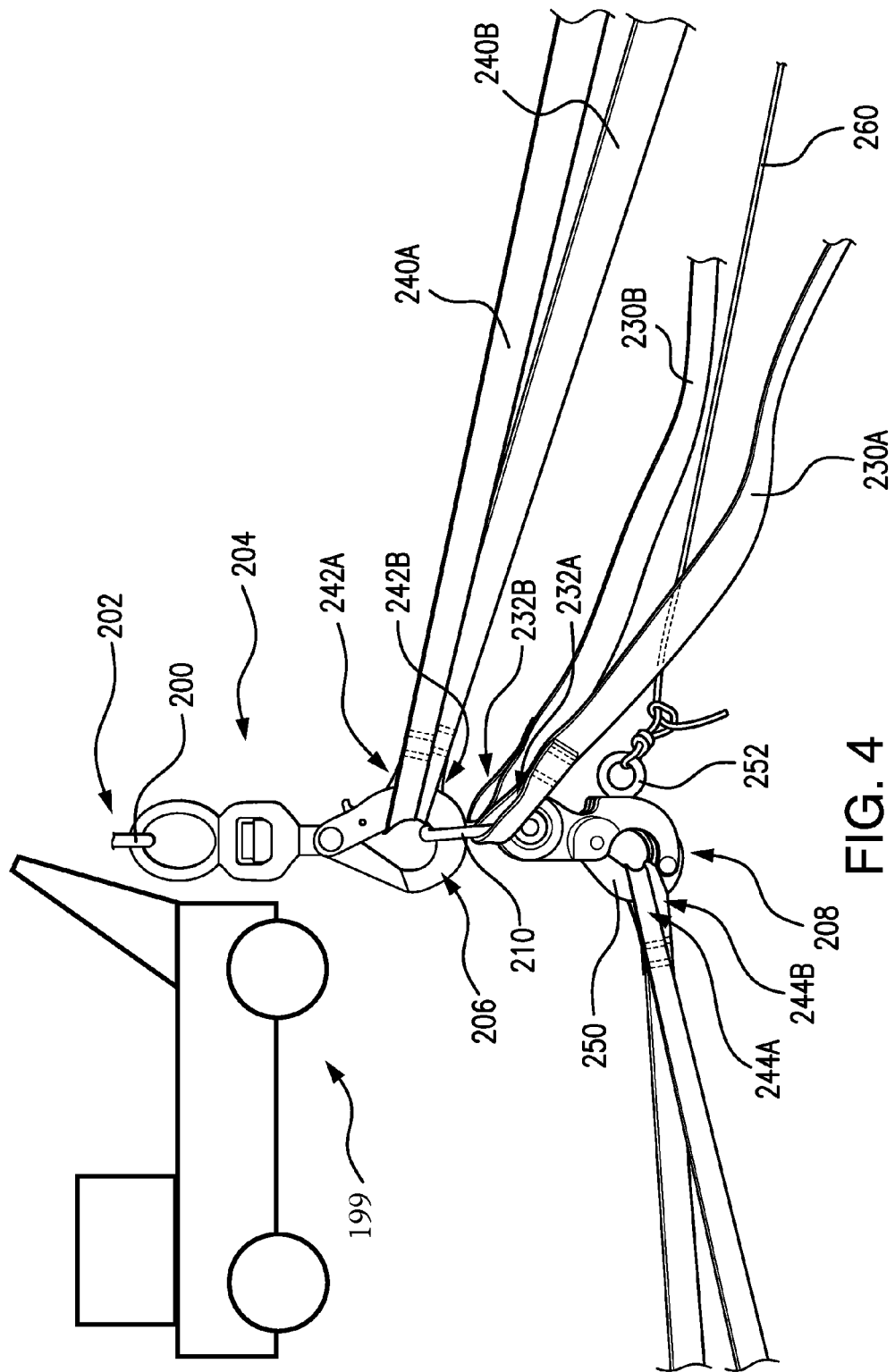

WASTE BAG USE METHODS AND APPARATUS

CROSS-REFERENCE TO RELATED APPLICATIONS

Benefit is claimed of U.S. patent application Ser. No. 61/750,747, filed Jan. 9, 2013, and entitled "Waste Bag Use Methods" and U.S. Patent Application Ser. No. 61/759,734, filed Feb. 1, 2013, and entitled "Waste Bag Use Methods and Apparatus" the disclosures of which are incorporated by reference herein in their entirety as if set forth at length.

BACKGROUND OF THE INVENTION

The disclosure relates to large waste bags or dumpster bags.

Several forms of dumpster bags have been sold commercially. One example is in International Application No. WO2007/108833A2, entitled "Bulk Material Handling System and Apparatus, published Sep. 27, 2007, the disclosure of which is incorporated by reference herein in its entirety as if set forth at length. An example of such a bag is seen in FIG. 3. As is discussed below, to hold its open form, this bag includes PVC pipe rim stays and sewn-in corner stay panels. Another bag has a generally rectangular planform wherein right angle corners are replaced by flat panels forming a near-rectangular octagon. Another bag is shown in U.S. Patent Application Ser. No. 61/745,938, filed Dec. 26, 2012, and entitled "Waste Bag and Assembly Methods" and U.S. patent application Ser. No. 14/141,267, filed Dec. 26, 2013, and entitled "Waste Bag and Assembly Methods", the disclosures of which are incorporated by reference herein in their entireties as if set forth at length.

Each of these exemplary bags has eight lifting/carry/securing/dumping loops: four top; and four bottom at or near the respective corners of the rectangular footprint. Typically, the upper four loops may be simultaneously used to lift whereas the lower four are dedicated to tie-down securing and dumping. For example, the upper four loops may be hooked to a hoist to lift a full bag into a metal dumpster or to another dump location. The hoist may be disconnected from those four and connected to an adjacent pair of the lower loops. The hoist may then use those two lower loops to invert and dump the bag contents.

SUMMARY OF THE INVENTION

According to one aspect of the disclosure, in a method for using a dumpster bag, the bag comprises: a flexible bag member including a bottom and a sidewall structure extending upward from the bottom to a rim; and a plurality of loops. The method comprises: engaging a hoist to a group of the loops; using the hoist to lift the bag containing contents; releasing the hoist from one or more of the loops; and using the hoist to again lift the bag to discharge the contents from the bag.

A further embodiment may additionally and/or alternatively include: the plurality of loops comprising a plurality of upper loops and a plurality of lower loops; the releasing being releasing from the upper loops; and the again lifting comprising lifting by the lower loops.

A further embodiment may additionally and/or alternatively include there being four said upper loops and four said lower loops and the engaging being to all four of the upper loops and two of the lower loops.

A further embodiment may additionally and/or alternatively include the engaging comprising: engaging one or more lifting straps to the four upper loops but not the two lower loops; and engaging one or more dumping straps to the two lower loops but not the four upper loops.

A further embodiment may additionally and/or alternatively include the releasing being a remote releasing.

A further embodiment may additionally and/or alternatively include the bag comprising polyethylene and polypropylene fiber.

A further embodiment may additionally and/or alternatively include the bag comprising a height of 1-2 meters, a width of 1-4 meters, and a depth of 1-3 meters.

A further embodiment may additionally and/or alternatively include the bag comprising said loops at each of four upper corners and four lower corners.

A further embodiment may additionally and/or alternatively include removing rim stays and/or corner stays prior to lifting.

A further embodiment may additionally and/or alternatively include the hoist being truck-mounted or trailer mounted and the discharging being into the truck or the trailer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2A is an enlarged interior corner view of the bag of FIG. 2.

FIG. 2B is an enlarged view of a corner stay joint of the bag of FIG. 2.

FIG. 2C is an enlarged view of a rim stay joint of the bag of FIG. 2.

FIG. 3A is an enlarged interior view of the bag of FIG. 3.

FIG. 4 is an isolated view of a lifting hook assembly and cooperating portions of straps for lifting a dumpster bag.

Like reference numbers and designations in the various drawings indicate like elements.

DETAILED DESCRIPTION

Figure 1:
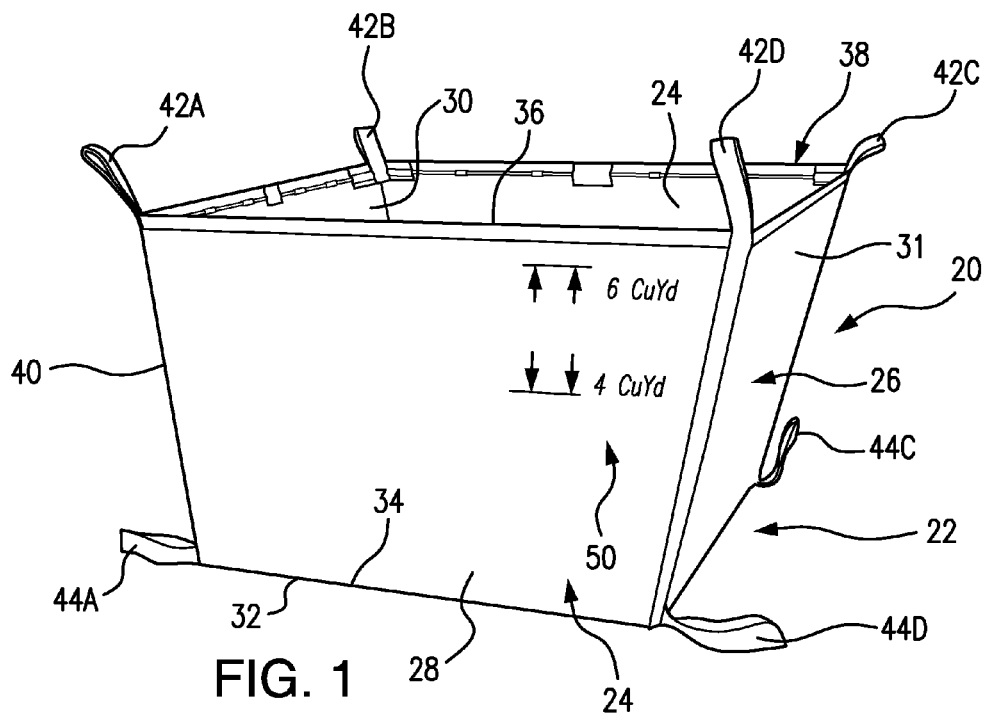
FIG. 1 is a view of an open top, generally right parallelepiped, dumpster bag having carry straps at all four upper corners and dump straps at all four lower corners.

FIG. 1 shows a dumpster bag. The bag is generally characterized by a polymer fabric (e.g., a polyethylene/polypropylene hybrid) body 22 having a generally rectangular planform with a rectangular base or bottom 24 and a sidewall structure 20 circumscribing the base or bottom and comprising four respective generally rectangular sidewalls 28, 29, 30, 31. The sidewalls each extend from a lower edge 32 at a corresponding peripheral edge 34 of the base to an upper edge 36 forming a rim 38 of the bag. Adjacent sidewalls meet at a junction or corner 40. Straps/loops (e.g., for lifting, dumping, tie-down or the like), gussets and other reinforcements, and other features may be of the type generally found in prior art bags or yet developed.

An exemplary nominal 6 cubic yard bag is 77"W×77"L× 45"H. The interior and/or exterior may bear fill level indicia 50 (e.g., lines and/or arrows and numbers (e.g., 2 cubic yards and 4 cubic yards in addition to a 6 cubic yard maximum)), allowing one bag size to be used in lieu of a series of sizes.

To hold the bag upright and open, in an assembled condition the bag includes stays (corner stays) 60 (FIG. 2) extending generally vertically along the corner junctions and stays (rim stays) 62 extending generally horizontally adjacent the upper edges of the four sidewalls. The exemplary corner stays are polymeric tube assemblies (e.g., PVC tube). Depending upon bag size, an exemplary corner stay may have a height of between about 0.5 and 2.0 meter (more particularly, 0.7-1.5 meter) and generally nearly bag height.

Figure 2:
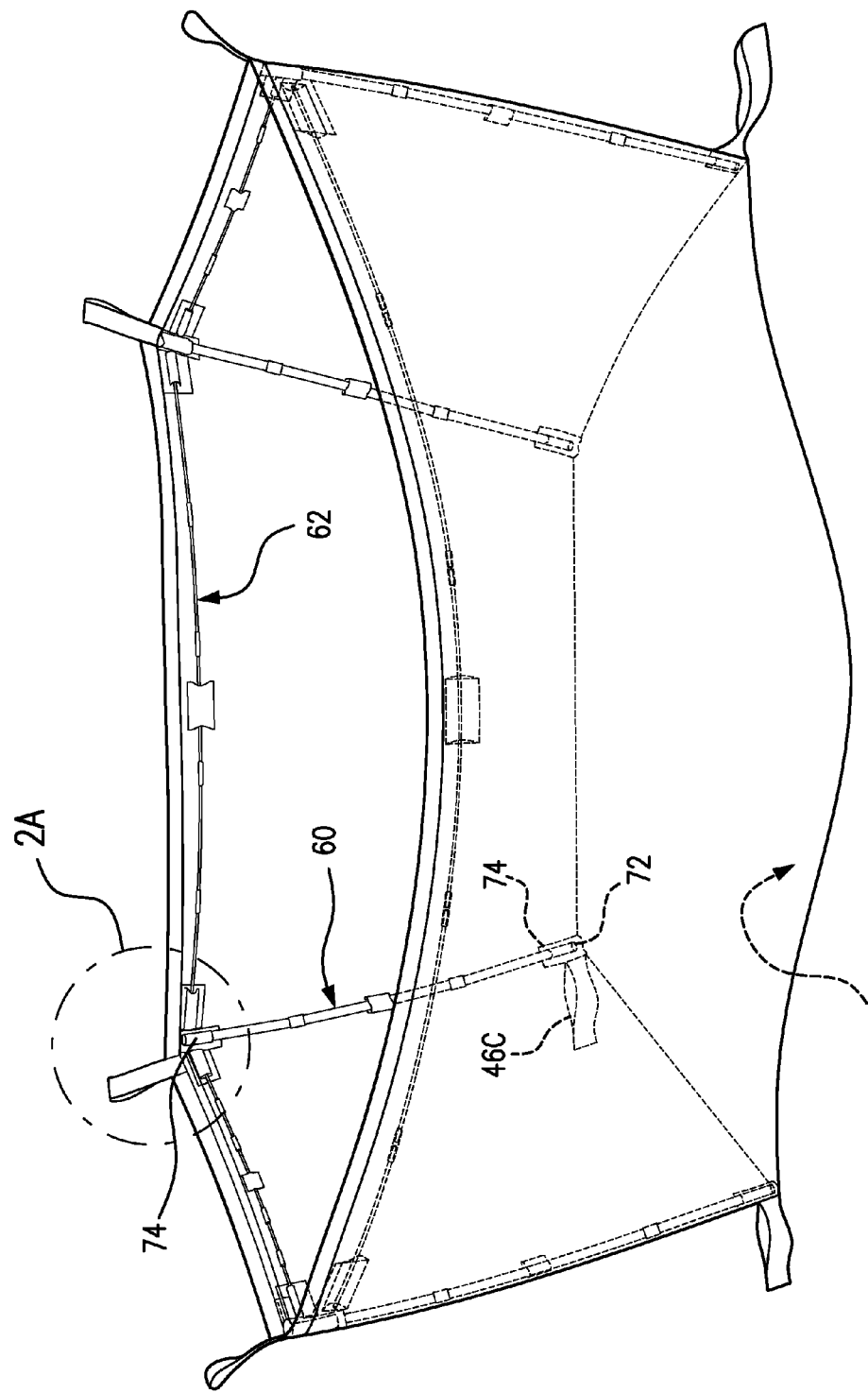
FIG. 2 is an interior view of an upper rim portion of the bag showing full width of one of the four sidewalls.

FIG. 2 shows each rim stay 62 secured on the interior near the rim 38 of the bag with ends 64, 65 of the rim stay received in sewn-in fabric pockets 66 near the corners adjoining the adjacent walls, an intermediate portion of the rim stay passing through a sewn-in loop 68 (e.g., woven strapping or a similar material to the main portion of the bag) to secure it in place. The corner stays 60 are also shown extending vertically along junctions 40 between the adjacent side panels and similarly between upper and lower end portions 70, 72 accommodated in opposed pockets 74 and an intermediate portion 76 passing through a loop 78.

Figure 3:
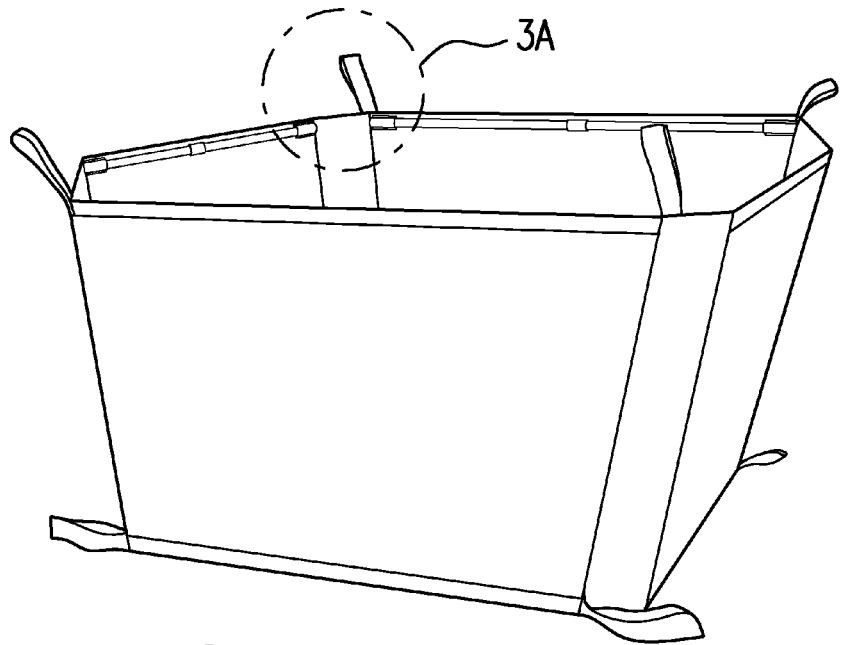
FIG. 3 is a view of a prior art bag comprising sewn-in corner panels and removable pipe rim stays.

If the bag is to be shipped or stored in a folded condition along with the stays, the planform dimensions of the folded bag may be less than the length of the corner says. Accordingly, the exemplary corner stays may be broken down into shorter lengths. In a simple example, this is done by forming each of the corner stays as a plurality of segments of plastic pipe 80 which may be assembled end-to-end. For example, it may be formed in an exemplary two-four segments, more particularly, three. For each segment-to-segment joint, one of the segments may be pre-fitted with an end collar 82 dimensioned to receive the mating end of the next segment. The collar 82 may be a standard pipe fitting or merely a larger pipe whose inner diameter (ID) is sufficient to accommodate the outer diameter (OD) of the segments 80. The collar may be secured to its associated segment by solvent or adhesive bonding or other means. These are similar to the rim stays of the FIG. 3 prior art bag.

For the rim stays 62, it is similarly desirable that they be shortenable for storage and transport. Exemplary rim stays are in the 1.0-4.0 or 1.0-3.0 meter range when assembled, more particularly, 1.5-2.5 meter (and generally about a couple of inches shorter than the associated wall dimension to provide room for the corner stays. The exemplary rim stays are formed by bungee pole (shock pole) assemblies as are used in some tents. Each such bungee pole assembly comprises a series of tubular segments 90 which may be secured end-to-end via fittings 92. For example, exemplary tubular segments are formed of fiberglass or other composite and, for each joint between segments, a tubular metallic fitting (ferrule) 92 is secured to one of the associated segments (e.g., via adhesive or crimping or via a central crimp 98 to hold the ferrule at the junction) to, in turn, receive the associated end of the other associated segment. An elastic member (shock cord) 100 extends through the fitting to draw the two segments together. In one example, a single elastic member extends the entire rim stay length and terminal ends of the terminal segments are covered with resilient elastomeric (e.g., rubber or plastic) caps 102 to avoid cutting the pocket receiving them. Each exemplary rim stay is formed in five segments (more broadly, 3-8 or 4-6). Exemplary tubular segment 90 outer diameter (OD) is less than 1 cm (e.g., nominal 0.25 inch outer diameter or, more broadly, 5-9 mm). From the assembled condition, the bungee pole stays may be extended at the joints to separate one segment end from the adjacent ferrule 92 whereupon it may be folded at the exposed cord. Assembly may be via the reverse, simply straightening and then letting the cord tension seat the segments in the ferrules.

Use of bungee poles for rim stays may have one or more of several advantages relative to using PVC tube assemblies. Greater physical flexibility of the bungee stays may account for several possible advantages. One such advantage is increased robustness. Another possible advantage is that the ability to flex the stay during installation allows the stay to be installed under compression (e.g., flexed in order to engage end pockets). This may allow such bungee stays to better hold the bag fully open than would other stays. Other advantages are that the bungee stays will be even more compact than pipe stays for shipping.

Such bag or the prior art bag may be used via a lift and dump process. An exemplary hoist in the form of a vehicle-mounted (truck-mounted or trailer-mounted) crane 199 is used. At the end 200 of its cable 202, the hoist has a hook assembly 204. The exemplary assembly includes a fixed main hook 206 and a remotely releasable hook 208. In this example, a ring or shackle 210 of the remotely releasable hook is suspended from the fixed hook. Other configurations are possible; however, the important feature is having a releasable hook while some other connection is not releasable or does not have to be released.

A plurality of straps is used in the lifting and dumping operation. In this example, there is a pair of dumping straps 230A, 230B and a pair of lifting straps 240A, 240B. Respective first ends of the dumping straps are formed by loops 232A, 232B. Respective second ends of the dumping straps include loops 234A, 234B that, in turn, bear hooks 236A, 236B. The lifting straps have first ends formed by loops 242A, 242B and second ends formed by loops 244A, 244B. The exemplary dumping straps bear hooks at one of their opposite ends whereas each exemplary lifting strap bears only loops. As is discussed further below, other strap configurations are possible including use of a single dumping strap and/or single lifting strap or other combinations.

For an arbitrarily chosen frame of convenient reference, one of the four sides of the bag will be referred to as the rear of the bag, the opposite side being the front, and the other two sides being left and right sides as judged from the perspective of the bag rather than from an observer facing the bag. In this example, the lifting will be from the rear to dump from the front. The dumping strap(s) is (are) used to connect the bag to the hoist for dumping. In this example, the hooks (or carabiners) 236A, 236B are used to connect to loops of the bag whereas the opposite end loops 232A, 232B are connected to the hook assembly (more particularly, to a non-releasing portion of the hook assembly such as the main hook 206 or the ring/shackle of the releasable hook 208). In an alternative embodiment with a single lifting strap, the strap body may be captured by the main hook or the ring/shackle of the releasable hook (or other connection that remains despite releasing of the releasable hook) with the ends connecting to the lower bag loops.

The exemplary releasable hook 208 (FIG. 4) includes a spring-loaded hook 250 pivotable between open and closed conditions and a release lever 252 for releasing the hook from the closed condition. A lanyard 260 is connected to the release lever allowing remote release.

Respective left and right terminal hooks 236A, 236B the dump strap(s) are connected to the respective associated left and right rear lower loop. This arrangement allows lifting by the lower rear of the bag to facilitate dumping.

The lifting strap(s) is (are) used for lifting. In this example, there are two separate lifting straps 240A, 240B. Other examples may involve more or fewer straps. With the arbitrarily defined direction, in the exemplary lifting, one strap 240A is defined as the left lifting strap and the other 240B is defined as the right lifting strap. Each of these exemplary straps (e.g., leather, fabric, rope, or cable) includes terminal loops (or shackles or carabiners or the like) for engaging the hooks. In this implementation, one end 242A, 242B of each strap is hooked to the main hook 206. Alternatively, if hooks or carabiners were used on the strap(s) it (they) could be hooked to the ring or shackle. Alternatively, a single strap could merely pass through the hook or ring or shackle. This effectively leaves protruding straps (or two protruding end portions of a single strap if a single strap were used).

Initially, as the attendant approaches a filled bag, the attendant may remove stays from the bag to avoid their damage in lifting and dumping. Portions of the lifting strap(s) and dumping strap(s) may be pre-secured to the hook assembly. In this example, these portions would be the dumping strap ends 232A, 232B and the lifting strap ends 242A, 242B. The releasable hook 208 may be open. The attendant locates the crane or other hoist with the hook assembly 204 suspended above the bag. The attendant then, in either order, engages the dumping strap(s) and lifting strap(s) to the bag. These respective left and right lifting straps or portions extending distally of the hook assembly may then be coupled to the bag loops (for example, coupled to the upper loops). More particularly, all the upper loops are coupled to such straps (in this example, the left strap 240A is passed back to the upper left rear loop to pass therethrough and the right strap 240B is passed back to the upper right rear loop to pass therethrough). The lifting straps then pass forward to the respective associated upper left front loop for the left strap and the upper right front loop for the right strap passing through such upper front loops and then passing back to the releasable hook. With the exemplary terminal loops 244A, 244B, the attendant may hook these loops over the open releasable hook and then close the releasable hook.

Figure 5:
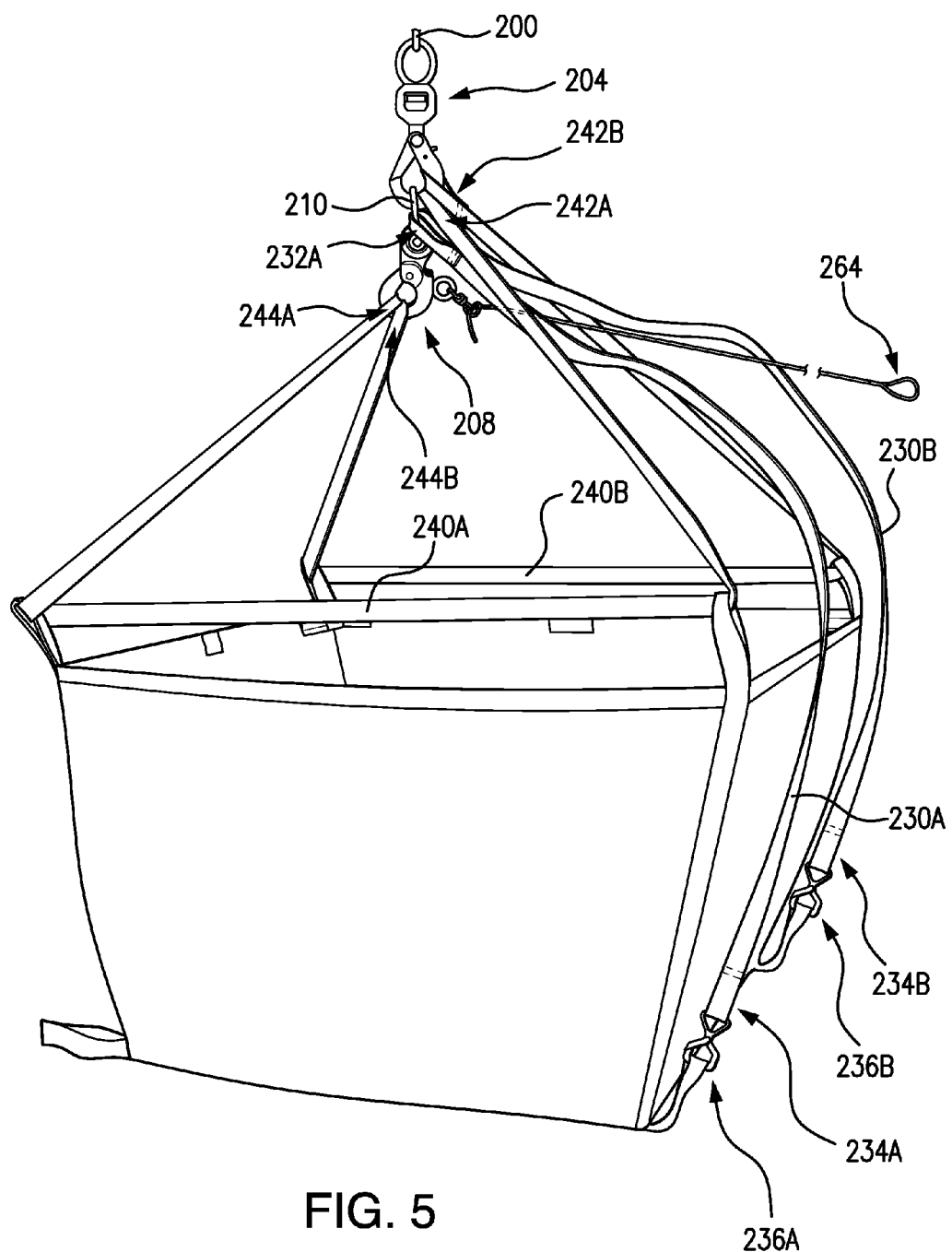
FIG. 5 is a view of the dumpster bag, hook assembly, and straps with the bag still supported atop ground or other support surface.

The attendant may secure the dumping strap(s) to the lower rear loops as previously discussed. The attendant may leave the lanyard extending free quite a distance away from the bag (e.g., so that an end portion 264 (FIG. 5) of the lanyard will remain on the ground throughout the process and will be easily accessed by the attendant).

Figure 6:
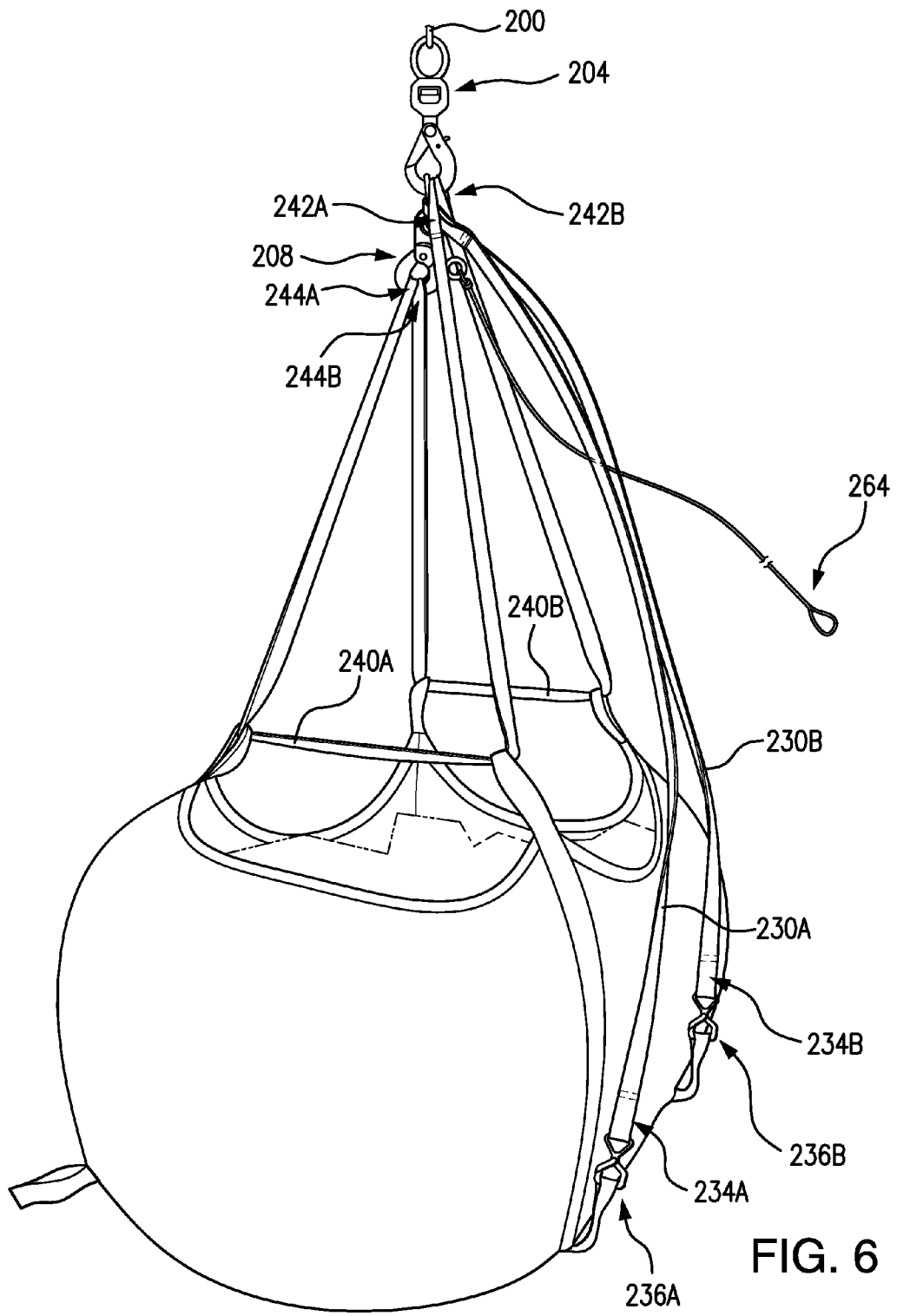
FIG. 6 is a view of the bag being lifted/carried by the hook assembly.

The attendant then uses the crane to lift the bag. The lifting strap(s) lift the bag by the upper loops on the bag (FIG. 6). There may be some residual lifting by the dumping strap depending on its length. The crane is used to lift the bag and move it to its desired dumping location by lowering the bag to at least partially take the load off the lifting straps. This may be at a remote location where the bag is to be dumped or may be, for example, in the bed of a truck or trailer into which the bag contents are to be dumped. An exemplary situation is with the bag supported atop the floor of such truck bed or trailer or atop any accumulation of refuse therein.

Figure 7:
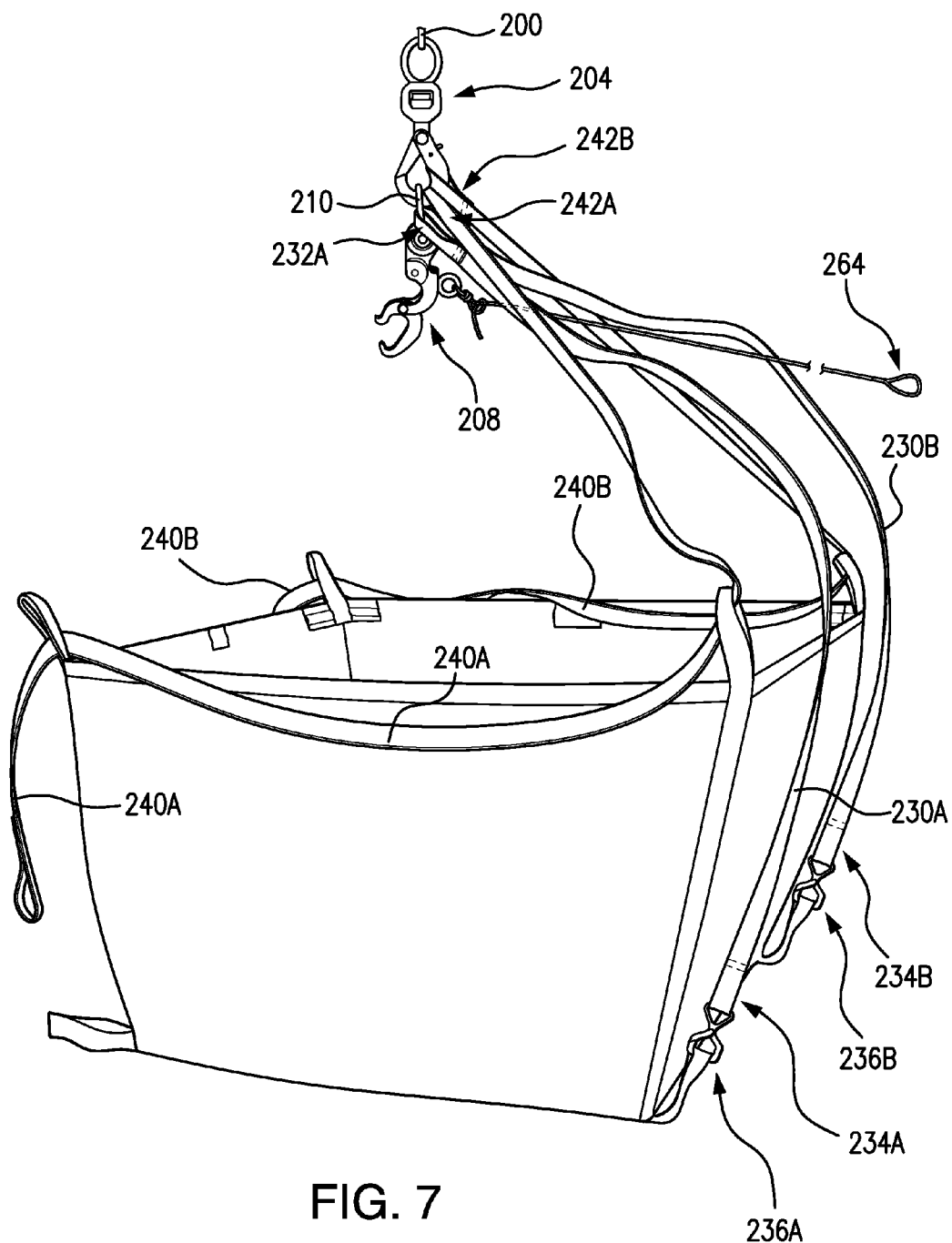
FIG. 7 is a view of the bag supported atop a support surface after strap release by the hook assembly.

The attendant then pulls the lanyard 260 to remotely release the releasable hook 208, freeing the associated ends 244A, 244B of the lifting straps (FIG. 7). The attendant then uses the crane to raise the bag. This may cause the lifting straps 240A, 240B to pull partially or fully through the associated upper loops allowing the front end of the bag to dangle while the dump straps lift the rear end of the bag via the rear loops (e.g., the lower rear loops).

Figure 8:
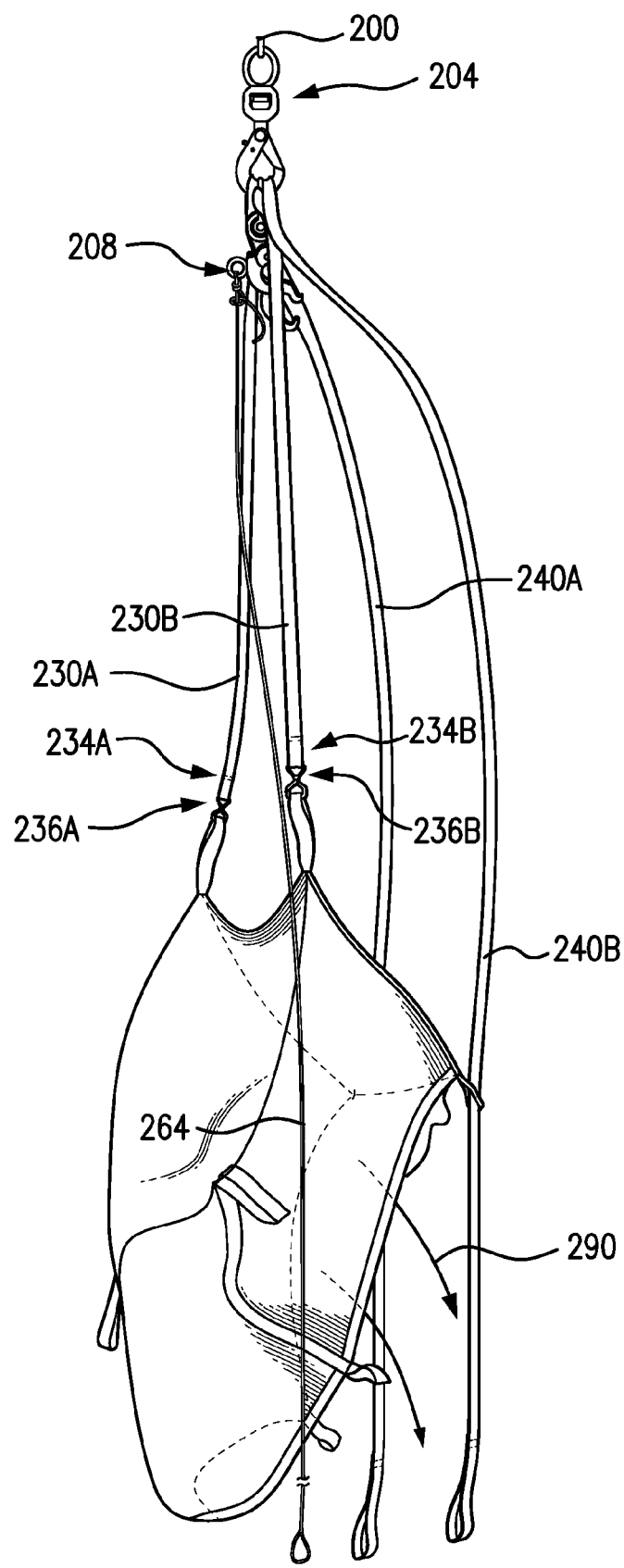
FIG. 8 is a view of the bag being dumped by relifting by the hook assembly after the release of FIG. 7.

Further lifting allows the bag to dump (FIG. 8) contents 290 over the dangling front wall and rim. The empty bag may be further lifted away from the dumped contents and removed. To the extent any stays had been left in the bag, those stays may be removed and the bag folded up for storage and ultimate reuse by reinstalling stays, refilling, etc.

And yet in alternate implementations, there may be an electrically-actuated releasable hook (e.g., with a remote switch and an electrical cord or wireless link replacing the lanyard).

One or more embodiments of the present invention have been described. Nevertheless, it will be understood that various modifications may be made without departing from the spirit and scope of the invention. For example, when implemented in the redesign of an existing bag, details of the existing bag may influence details of any particular implementation. Accordingly, other embodiments are within the scope of the following claims.

What is claimed is:

1. A method for using a dumpster bag, the bag comprising:
    a flexible bag member including a bottom and a sidewall structure extending upward from the bottom to a rim; and
    a plurality of loops,
the method comprising:
    engaging a hoist to a group of the loops;
    using the hoist to lift the bag containing contents;
    releasing the hoist from one or more of the loops of the group while leaving it engaged to one or more others of the group of loops; and
    using the hoist to again lift the bag by the one or more others to discharge the contents from the bag,
wherein:
    the plurality of loops comprises:
        a plurality of upper loops; and
        a plurality of lower loops;
    the releasing is releasing from the upper loops; and
    the again lifting comprises lifting by the lower loops.

2. The method of claim 1 wherein: there are four said upper loops and four said lower loops; and the engaging is to all four of the upper loops and two of the lower loops.

3. The method of claim 2 wherein the engaging comprises: engaging one or more lifting straps to the four upper loops but not the two lower loops; and engaging one or more dumping straps to the two lower loops but not the four upper loops.

4. The method of claim 3 wherein:
    the releasing is releasing of the one or more lifting straps; and
    the using the hoist to again lift the bag by the one or more others to discharge the contents from the bag comprises lifting by the one or more dumping straps.

5. The method of claim 3 wherein: the releasing is a releasing of a remote release hook.

6. The method of claim 3 wherein: the releasing is a remote releasing.

7. The method of claim 1 wherein: the releasing is a remote releasing.

8. The method of claim 1 wherein: the bag comprises polyethylene and polypropylene fiber.

9. The method of claim 1 wherein: the bag comprises a height of 1-2 meters, a width of 1-4 meters, and a depth of 1-3 meters.

10. The method of claim 1 wherein: the bag comprises said loops at each of four upper corners and four lower corners.

11. The method of claim 1 further comprising: removing rim stays and/or corner stays prior to lifting.

12. The method of claim 1 wherein: the hoist is truck-mounted or trailer mounted; and the discharging is into the truck or the trailer.

13. The method of claim 1 wherein: the releasing is a releasing of a remote release hook.

14. The method of claim 1 wherein: the hoist is engaged to the one or more others of the group of loops prior to the using the hoist to lift the bag containing contents.

15. The method of claim 1 wherein: there are four said upper loops and four said lower loops; and the engaging is to all four of the upper loops and only two of the lower loops.

16. The method of claim 15 wherein the engaging comprises: engaging one or more lifting straps to the four upper loops but not the two lower loops; and engaging one or more dumping straps to the two lower loops.

17. The method of claim 16 wherein:
   the releasing is releasing of the one or more lifting straps; and
   the using the hoist to again lift the bag by the one or more others to discharge the contents from the bag comprises lifting by the one or more dumping straps.

18. The method of claim 17 wherein: the releasing is a releasing of a remote release hook.

19. The method of claim 16 wherein: the releasing is a releasing of a remote release hook.

* * * * *